United States Patent
Bloom et al.

(10) Patent No.: US 7,450,756 B2
(45) Date of Patent: Nov. 11, 2008

(54) METHOD AND APPARATUS FOR INCORPORATING IRIS COLOR IN RED-EYE CORRECTION

(75) Inventors: Daniel M. Bloom, Loveland, CO (US); Christopher A. Whitman, Fort Collins, CO (US); Jason E. Yost, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 817 days.

(21) Appl. No.: 11/117,822

(22) Filed: Apr. 28, 2005

(65) Prior Publication Data

US 2006/0245643 A1    Nov. 2, 2006

(51) Int. Cl.
    *G06K 9/00* (2006.01)
(52) U.S. Cl. ...................... 382/167; 382/165
(58) Field of Classification Search .............. 382/165, 382/167, 190, 195, 286, 291; 348/371
    See application file for complete search history.

(56) References Cited

U.S. PATENT DOCUMENTS

| 5,990,973 | A | 11/1999 | Sakamoto et al. |
|---|---|---|---|
| 6,278,491 | B1 | 8/2001 | Wang et al. |
| 6,407,777 | B1 * | 6/2002 | DeLuca ...................... 348/576 |
| 6,728,401 | B1 * | 4/2004 | Hardeberg .................. 382/167 |
| 6,873,743 | B2 * | 3/2005 | Steinberg .................... 382/275 |
| 2002/0102024 | A1 | 8/2002 | Jones et al. |
| 2005/0248664 | A1 | 11/2005 | Enge |
| 2006/0039690 | A1 | 2/2006 | Steinberg et al. |

FOREIGN PATENT DOCUMENTS

| EP | 0989517 A | 3/2000 |
|---|---|---|
| WO | WO 2006011630 A | 2/2006 |

OTHER PUBLICATIONS

Huitao Luo, et.al, "Detecting and Correcting Redeye in an Image", HP pending patent application 200313342-1, filed Aug. 29, 2003, U.S. Appl. No. 10/653,019, 59 pgs.
Paul Viola, et.al, "Rapid Object Detection Using A Boosted Cascade of Simple Features", Mitsubishi Electric Research Laboratories, Inc., copyright 2004, 9 pgs..

* cited by examiner

*Primary Examiner*—Phuoc Tran

(57) ABSTRACT

When using a strobe in capturing a digital image is determined to be imminent, a pre-capture image may be saved from which iris-color information can be derived. The iris-color information derived from the pre-capture image may be used to improve red-eye correction of the captured digital image.

43 Claims, 10 Drawing Sheets

METHOD AND APPARATUS FOR INCORPORATING IRIS COLOR IN RED-EYE CORRECTION

FIELD OF THE INVENTION

The present invention relates generally to digital photography and more specifically to techniques for correcting red-eye effect in digital images captured using a strobe.

BACKGROUND OF THE INVENTION

A pervasive problem in flash photography is the so-called "red-eye effect," in which an on-camera flash reflects off the back of the eyes of a subject, causing the subject's eyes to appear red. The problem is so common that many digital photo-editing applications include an automatic or manual red-eye correction feature.

Some digital cameras are also capable of performing automatic in-camera red-eye correction.

Automatic red-eye correction involves locating the portions of an image in which the red-eye effect appears and replacing the red pixels in the iris of each affected eye with pixels of a predetermined color (e.g., black). The result, though an improvement over the original "red eyes," still may not look natural to an observer because the true iris color of each corrected eye is not taken into account in the correction process.

It is thus apparent that there is a need in the art for an improved method and apparatus for incorporating iris color in red-eye correction of digital images.

DETAILED DESCRIPTION OF THE INVENTION

Red-eye correction can be improved by detecting that the use of a strobe in capturing a primary digital image is imminent, capturing and saving a pre-capture image without the strobe (or with a reduced-intensity strobe) before the primary digital image is captured, and incorporating iris-color information derived from the pre-capture image in subsequent red-eye correction of the primary digital image.

Optionally, the pre-capture image may be captured and saved only if at least one human face is detected in a scene during a live preview mode of the digital imaging device that captures the primary digital image.

The pre-capture image (or, alternatively, an iris color derived from the pre-capture image and an associated location indicator) may be stored with the primary digital image in a single digital image file. Alternatively, the pre-capture image may be stored separately from the primary digital image. Red-eye correction incorporating the iris-color information derived from the pre-capture image may be performed by the digital imaging device that captured the primary digital image or by a separate device (e.g., a personal computer) to which the digital image file has been transferred.

Optionally, the luminance of the iris color may be adjusted in accordance with a comparison of mean luminance between the pre-capture image and the primary digital image.

Figure 1A:
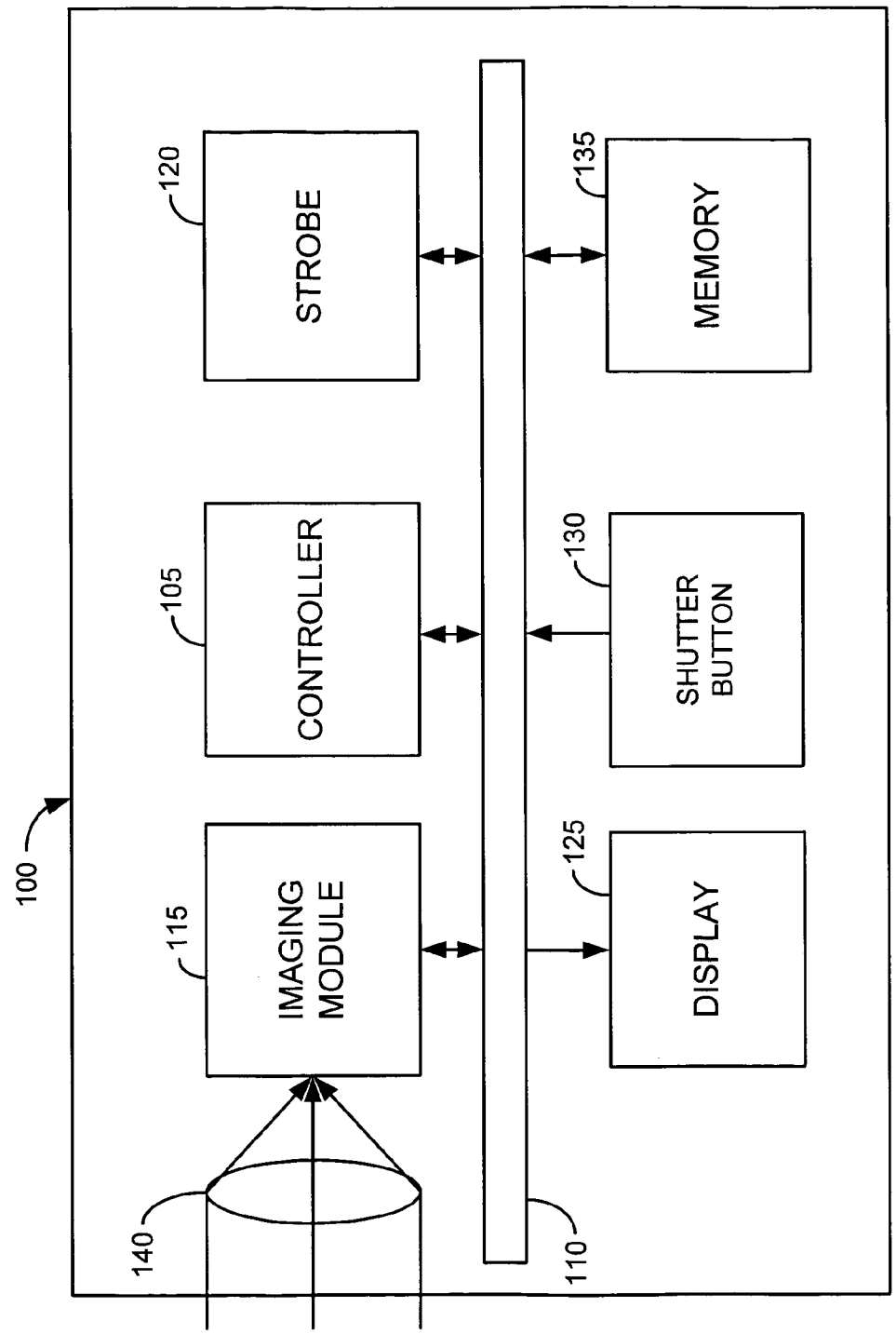
FIG. 1A is a functional block diagram of a digital imaging device in accordance with an illustrative embodiment of the invention.

FIG. 1A is a functional block diagram of a digital imaging device 100 in accordance with an illustrative embodiment of the invention. Digital imaging device may be any device capable of capturing and storing a digital image, such as a digital camera, a digital camcorder, or a personal digital assistant (PDA) or radiotelephone with a built-in digital-camera feature. In FIG. 1A, controller 105 communicates over data bus 110 with imaging module 115, strobe 120, display 125, shutter button 130, and memory 135. Optical system 140 produces optical images that are converted to digital images by imaging module 115. Controller 105 may, e.g., comprise a microprocessor or microcontroller. Imaging module 115 may comprise an array of photosensors based on charge-coupled-device (CCD), CMOS, or other imaging-sensor technology; an analog-to-digital converter (A/D); a gain control; and a digital signal processor (DSP) (not shown in FIG. 1A). Display 125 may, e.g., comprise a liquid crystal display (LCD). Shutter button 130 may have three distinct positions: "S0" (not depressed), "S1" (depressed to an intermediate position that prepares digital imaging device 100 for capturing an image), and "S2" (the fully depressed position that initiates image capture). Digital imaging device 100 may have other input controls such as navigational buttons and a menu/"ok" button that are not shown in FIG. 1A.

Figure 1B:
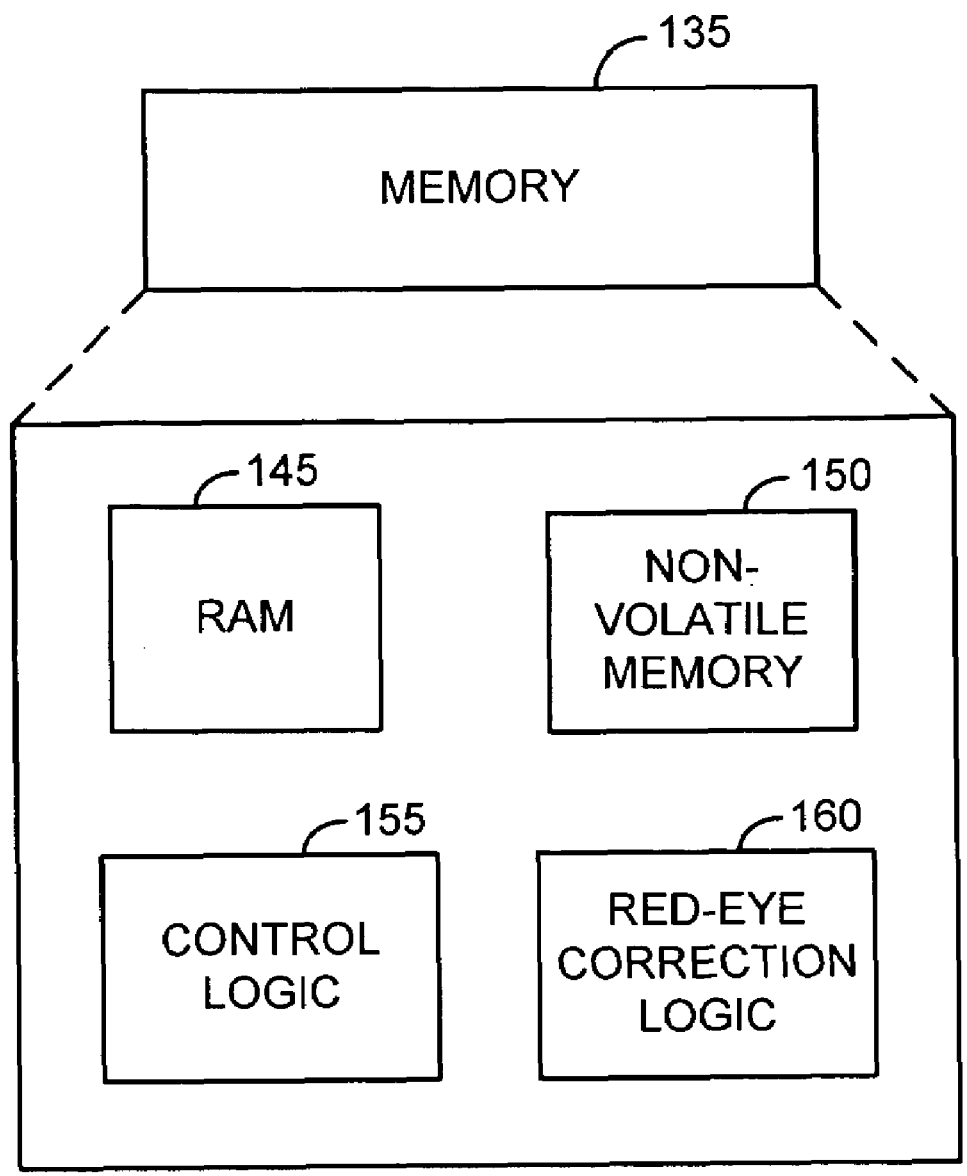
FIG. 1B is a functional diagram of a memory of the digital imaging device shown in FIG. 1A in accordance with an illustrative embodiment of the invention.

FIG. 1B is a high-level diagram of memory 135 of digital camera 100 in accordance with an illustrative embodiment of the invention. In general, memory 135 may comprise both random access memory (RAM) 145 and non-volatile memory 150, which may be of the removable variety (e.g., a secure digital or multi-media memory card). Memory 135 may further comprise control logic 155 and red-eye correction logic 160.

Control logic 155 may control image capture, in particular the capture and storage of a pre-capture image, when the use of a strobe is imminent and shutter button 130 is pressed to S2. Optionally, control logic 155 may also be configured to detect the presence of one or more human faces in a scene during a live preview mode of digital imaging device 100 and to capture and save a pre-capture image only if at least one human face is detected. One example of how real-time face detection may be performed during live preview mode may be found in pending U.S. patent application Ser. No. 09/992,795, which is assigned to Compaq Computer Corporation (now merged with Hewlett-Packard Company), the disclosure of which is incorporated herein by reference.

Red-eye correction logic 160 may identify one or more red-eye regions in a digital image and perform automatic red-eye correction on those red-eye regions to produce a corrected digital image. Automatic red-eye detection and removal techniques are well known in the digital image processing art. Examples include U.S. Pat. No. 6,278,491 and pending U.S. patent application Ser. No. 10/653,019, both assigned to Hewlett-Packard Company, the disclosures of which are incorporated herein by reference. Essentially, red-eye removal involves replacing red pixels with those of a more suitable color where the red-eye effect has occurred in a digital image. Red-eye correction logic 160 may be configured to incorporate iris-color information derived from a pre-capture image.

Control logic 155 and red-eye correction logic 160 may be implemented as software, firmware, hardware, or any combination thereof. In one illustrative embodiment, control logic 155 and red-eye correction logic 160 comprise stored program instructions residing in firmware that are executed by controller 105.

Figure 2:
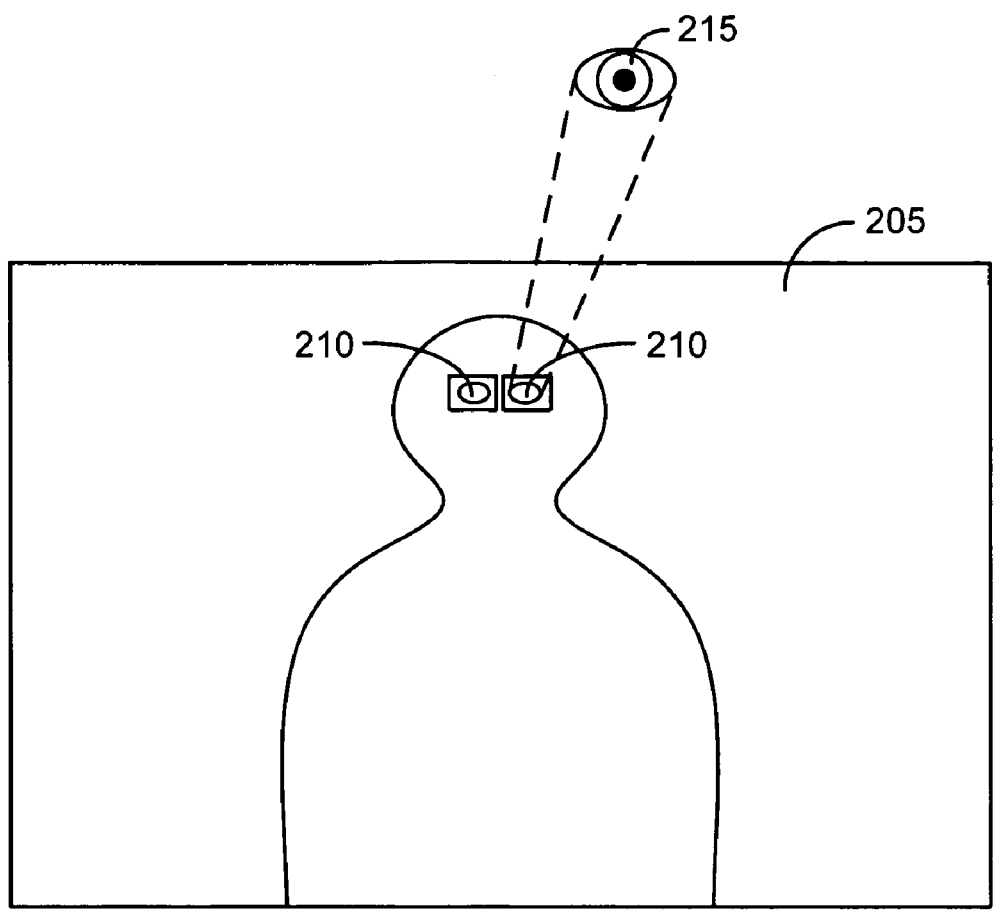
FIG. 2 is an illustration showing a pre-capture image in which iris-color regions have been identified and from which an iris color has been obtained, in accordance with an illustrative embodiment of the invention.

FIG. 2 is an illustration showing a pre-capture image 205 in accordance with an illustrative embodiment of the invention. Pre-capture image 205 may be, for example, a preview frame from a live preview mode of digital imaging device 100.

The preview frame may be captured without the use of strobe 120 to avoid the occurrence of red-eye effect in pre-capture image 205. In one embodiment, pre-capture image 205 may be the last preview frame captured during live preview mode before a digital image is captured (using strobe 120) in response to shutter button 130 being depressed to the S2 position. Preview frames are typically lower in resolution than a final captured digital image because they are normally displayed at video rate on display 125 as a user composes a photograph. When red-eye correction logic 160 has identified one or more regions containing red-eye effect ("red-eye regions") in a captured digital image, a search within pre-capture image 205 may reveal the corresponding regions that are free of the red-eye effect within pre-capture image 205.

Those regions ("iris-color regions" 210) are indicated for convenience with bounding boxes in FIG. 2. Although there may be slight motion between the preview frame and the captured digital image, locating iris-color regions 210 in pre-capture image 205 may be accomplished through a localized search within pre-capture image 205.

Within each iris-color region 210, an iris color 215 may be obtained for use in red-eye correction by red-eye correction logic 160.

In a different embodiment, pre-capture image 205 may be a pre-flash image instead of a preview frame. A pre-flash image is an image captured using a reduced-intensity strobe immediately before the primary digital image is captured and may be used to more accurately set exposure for the use of strobe 120 in capturing the primary digital image. Since a reduced-intensity strobe is used, such an image is ordinarily free of red-eye effect and may be used to obtain an iris color 215. As with a preview frame, control logic 155 may be configured to save the pre-flash image in memory 135 (e.g., in the same digital image file with the primary digital image).

Using a pre-flash image instead of a preview frame as pre-capture image 205 may have the advantage that the pre-flash image is less likely to be overly dark, improving the probability that red-eye correction logic 160 can obtain a usable iris color 215 from pre-capture image 205.

Figure 3A:
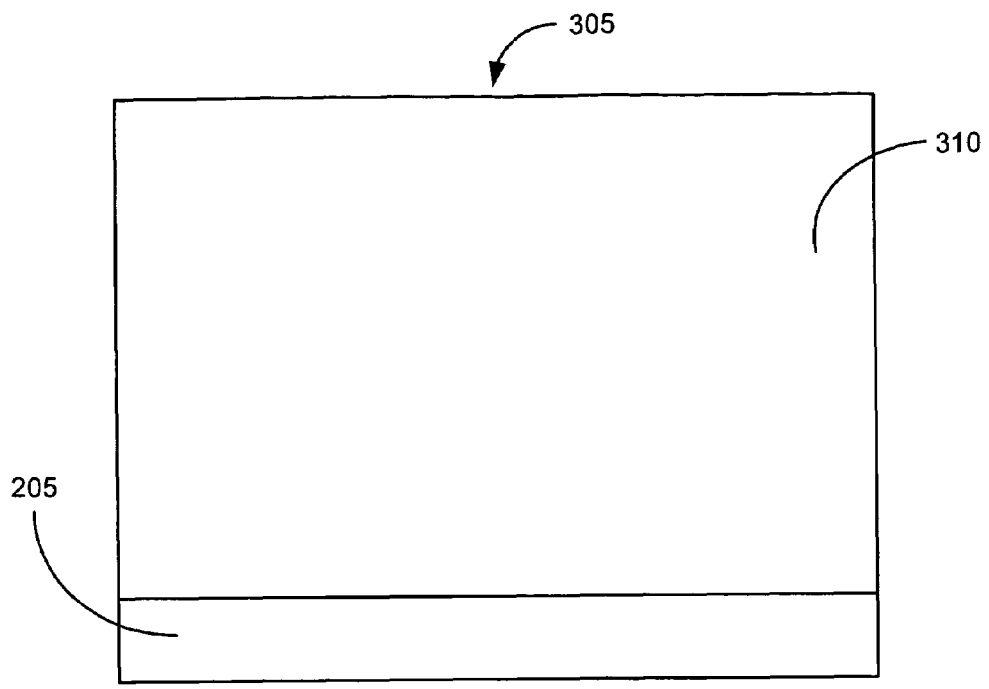
FIG. 3A is a diagram of a digital image file that includes a pre-capture image in accordance with an illustrative embodiment of the invention.
Figure 3B:
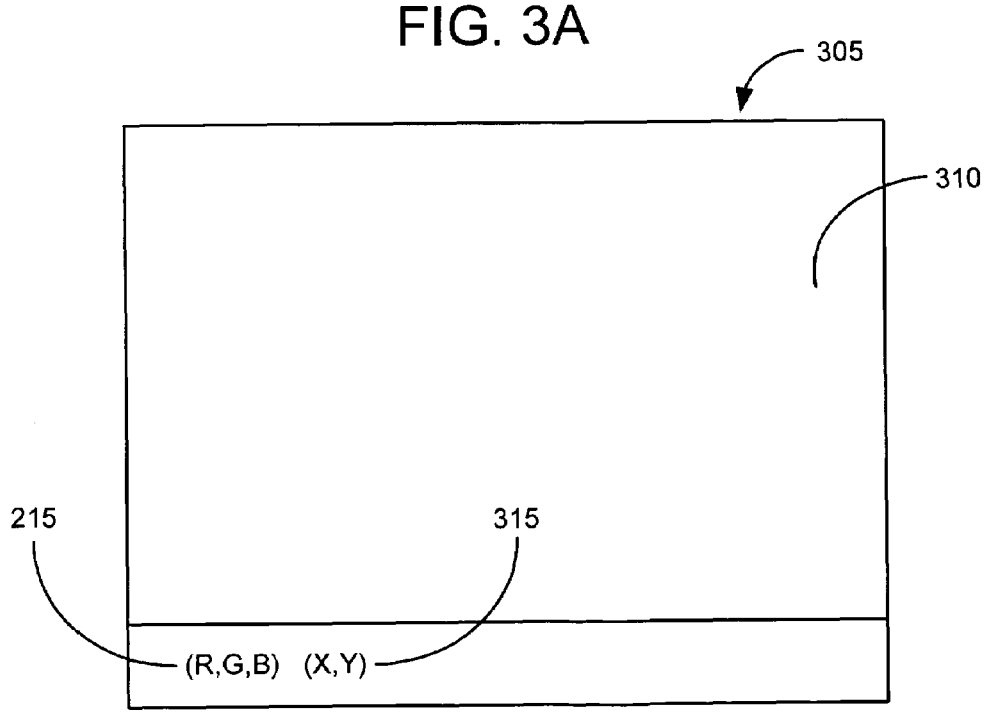
FIG. 3B is a diagram of a digital image file that includes an iris color and a location indicator in accordance with another illustrative embodiment of the invention.

FIG. 3A is a diagram of a digital image file 305 in accordance with an illustrative embodiment of the invention. The rectangle in FIGS. 3A and 3B represents a block of memory in a storage device such as memory 135. In the embodiment of FIG. 3A, digital image file 305 comprises a primary digital image 310 and an associated pre-capture image 205. In some embodiments, only a portion of a pre-capture image 205 is stored with primary digital image 310 (i.e., those portions of pre-capture image 205 that correspond to red-eye regions in primary digital image 310).

In other embodiments, control logic 155 may store pre-capture image 205 (or one or more relevant portions thereof) separately from primary digital image 310, but primary digital image 310 and pre-capture image 205 may still be linked or associated with each other somehow. In the form depicted in FIG. 3A, digital image file 305 may be transferred from digital imaging device 100 to another electronic device such as a personal computer (PC) or a PDA. Red-eye correction incorporating iris color 215 may be performed in the other electronic device rather than in digital imaging device 100, as will be explained more fully later in this detailed description.

FIG. 3B is a diagram of a digital image file 305 in accordance with another illustrative embodiment of the invention. In the embodiment shown in FIG. 3B, digital image file 305 comprises primary digital image 310, iris color 215, and location indicator 315. For simplicity, only one iris color 215 and location indicator 315 is shown in FIG. 3B, but multiple sets of iris colors 215 and location indicators 315 may be stored with primary digital image 310, if there are multiple red-eye regions in primary digital image 310. Location indicator 315 specifies the location of a red-eye region within primary digital image with which a given iris color 215 (obtained from a corresponding iris-color region 210 in pre-capture image 205) is associated. For example, location indicator 315 may comprise a set of coordinates relative to a predetermined origin within primary digital image 310. In the embodiment shown in FIG. 3B, control logic 155 may save pre-capture image 205 in memory 135. Red-eye correction logic 160 (or control logic 155, depending on the implementation) may subsequently (1) identify red-eye regions in primary digital image 310, (2) locate corresponding iris-color regions 210 in pre-capture image 205, (3) obtain an iris color 215 from each iris-color region 210, and (4) save the iris colors 215 and corresponding location indicators 315 with primary digital image 310 in a single digital image file 305, deferring red-eye correction incorporating iris-color information until a later time or after digital image file 305 has been transferred to a different device.

Figure 4A:
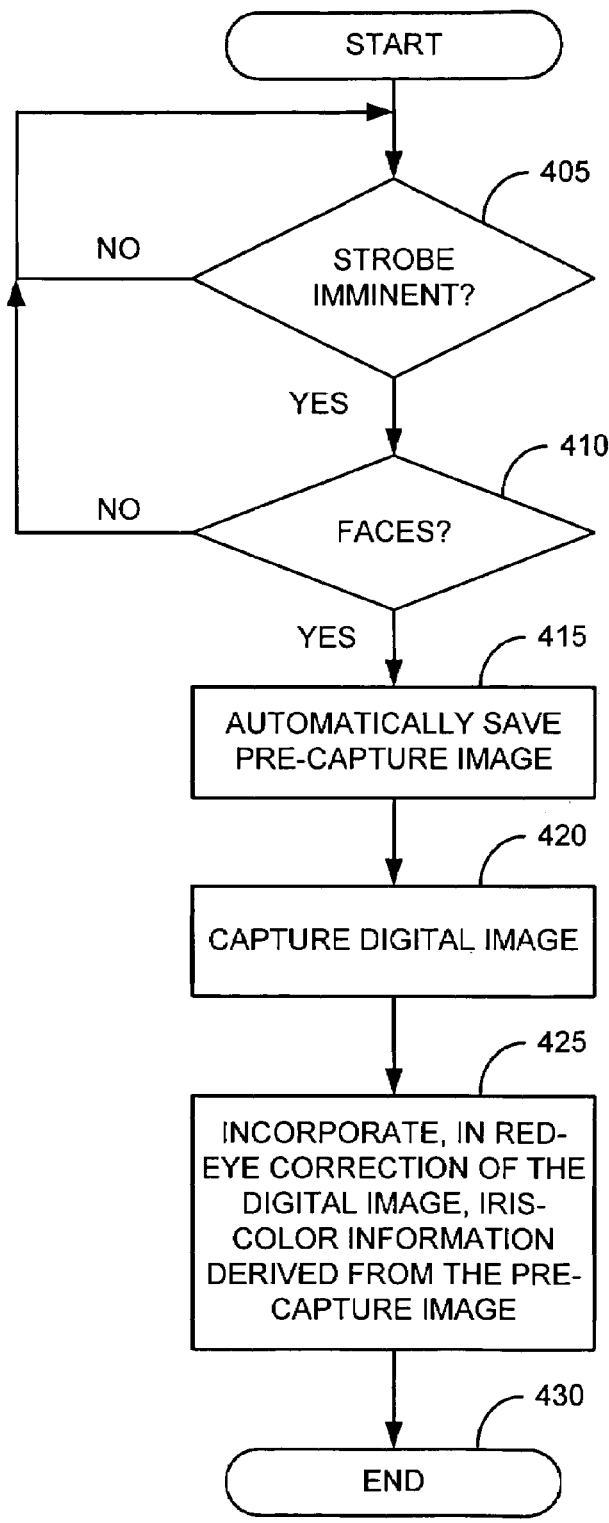
FIG. 4A is a flowchart of a method for correcting red-eye effect in accordance with an illustrative embodiment of the invention.

FIG. 4A is a flowchart of a method for correcting red-eye effect in accordance with an illustrative embodiment of the invention. At 405, control logic 155 may determine whether the use of strobe 120 in capturing primary digital image 310 is imminent, when shutter button 130 is depressed to the S2 position. If so, control logic 155 may perform optional human face detection at 410, as explained above. If at least one human face is detected at 410, control logic 155 may automatically save at least the relevant portions of a pre-capture image 205 at 415. At 420, digital imaging device 100 may capture primary digital image 310. At 425, red-eye correction logic 160 may perform red-eye correction on primary digital image 310, incorporating iris-color information derived from pre-capture image 205. The process may terminate at 430.

Figure 4B:
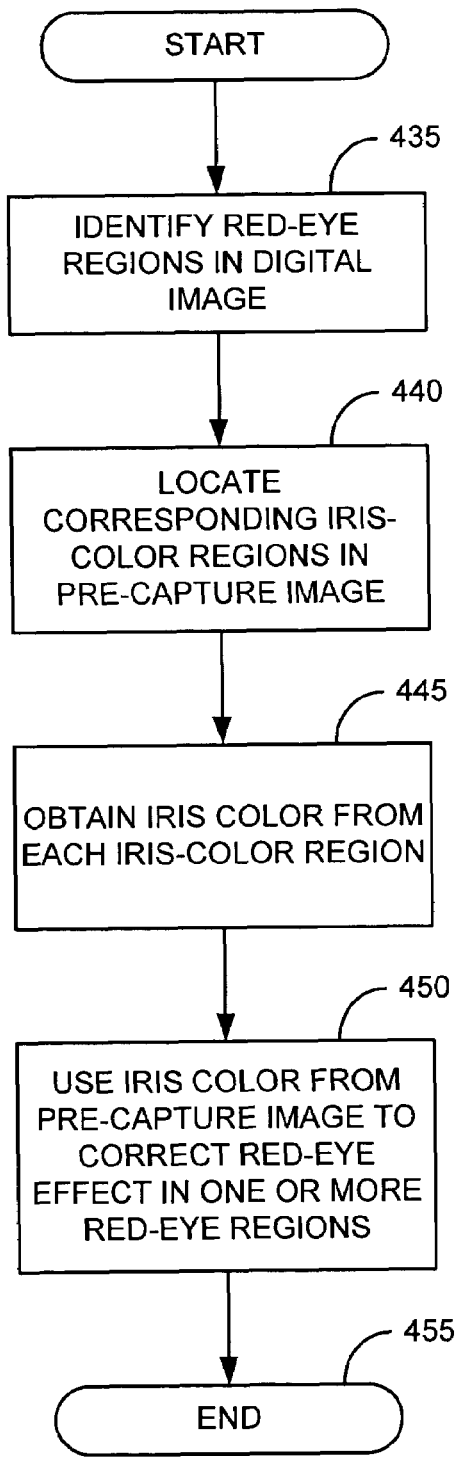
FIG. 4B is a flowchart of a method for incorporating, in red-eye correction of a primary digital image, iris-color information derived from a pre-capture image in accordance with an illustrative embodiment of the invention.
Figure 4C:
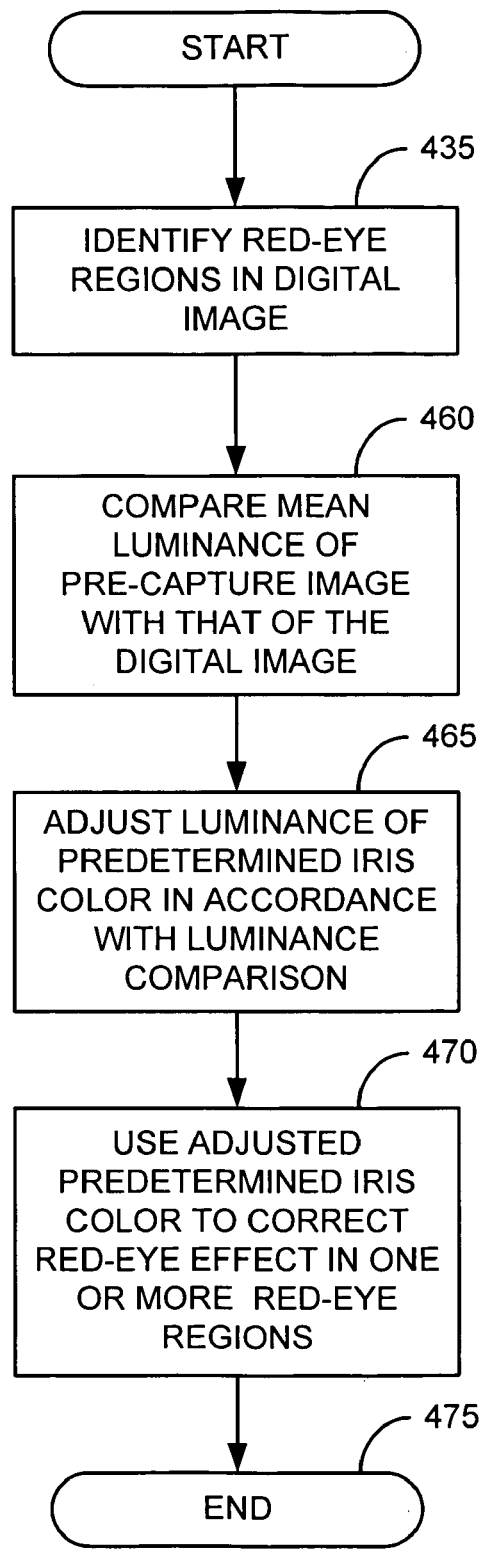
FIG. 4C is a flowchart of a method for incorporating, in red-eye correction of a primary digital image, iris-color information derived from a pre-capture image in accordance with another illustrative embodiment of the invention.
Figure 4D:
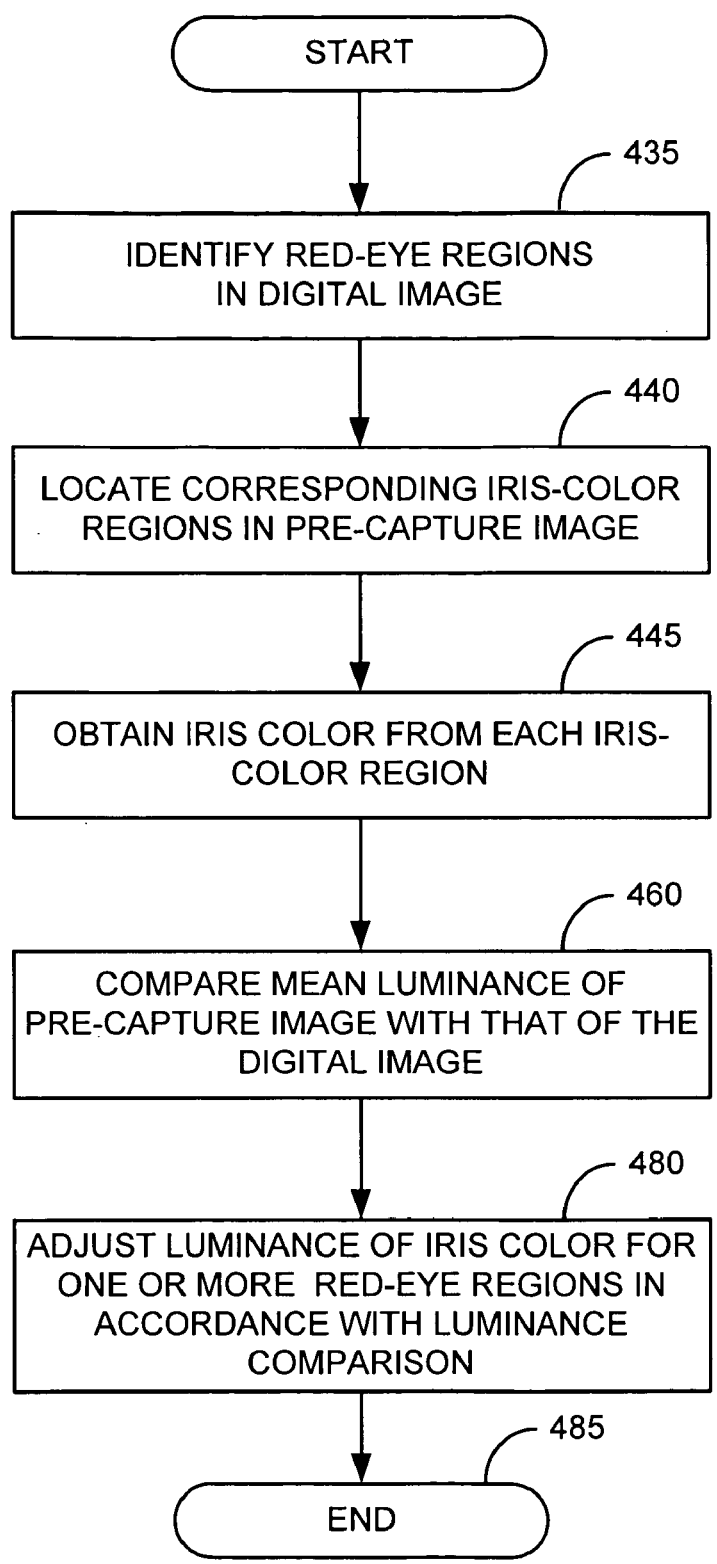
FIG. 4D is a flowchart of a method for incorporating, in red-eye correction of a primary digital image, iris-color information derived from a pre-capture image in accordance with yet another illustrative embodiment of the invention.

There are different ways in which iris-color information may be derived from pre-capture image 205 and incorporated in red-eye correction. FIGS. 4B-4D illustrate three different illustrative embodiments.

FIG. 4B is a flowchart of a method for incorporating, in red-eye correction of a primary digital image 310, iris-color information derived from a pre-capture image 205 in accordance with an illustrative embodiment of the invention. At 435, red-eye correction logic 160 may identify one or more red-eye regions in primary digital image 310. Red-eye correction logic 160 may locate corresponding iris-color regions 210 in pre-capture image 205 at 440. At 445, red-eye correction logic 160 may obtain, from each iris-color region 210, an iris color 215 with which to correct the iris color in the corresponding red-eye region in primary digital image 310. At 450, red-eye correction logic 160 may use the iris colors 215 to correct the red-eye effect in one or more red-eye regions in primary digital image 310. At 455, the process may terminate.

FIG. 4C is a flowchart of a method for incorporating, in red-eye correction of a primary digital image 310, iris-color information derived from a pre-capture image 205 in accordance with another illustrative embodiment of the invention. The embodiment shown in FIG. 4C employs a different approach for incorporating, in red-eye correction of primary digital image 310, iris-color information derived from pre-capture image 205. At 435, red-eye correction 160 may identify red-eye regions within primary digital image 310, as explained in connection with FIG. 4B. At 460, red-eye correction logic 160 may compute the mean luminance (e.g., by constructing a linear or logarithmic histogram) of the pre-capture image 205 and the primary digital image 310. Red-eye correction logic may then compare the mean luminances to determine a ratio. At 465, the luminance of a predetermined iris color 215 (e.g., black or a selected shade of dark gray) may be adjusted in accordance with the luminance comparison at 460. That is, the contribution of strobe 120 in primary digital image 310 may be determined by comparison with pre-capture image 205 so that the luminance of a predetermined (generic) iris color 215 may be adjusted accordingly for a more natural look. At 470, the luminance-adjusted predetermined iris color 215 may be used to correct red-eye effect in one or more red-eye regions of primary digital image 310. The process may terminate at 475.

FIG. 4D is a flowchart of a method for incorporating, in red-eye correction of a primary digital image 310, iris-color information derived from a pre-capture image 205 in accordance with yet another illustrative embodiment of the invention. In this embodiment, the techniques shown in FIGS. 4B and 4C are combined: the luminance of a natural iris color 215 obtained from an iris-color region 210 of pre-capture image 205 may be adjusted in accordance with a comparison of mean luminance between pre-capture image 205 and primary digital image 310 at 480. Adjusting the luminance of a natural iris color 215 in this fashion may produce more natural looking red-eye correction because it takes into account the contribution of strobe 120 in primary digital image 310. At 485, the process may terminate.

Figure 5A:
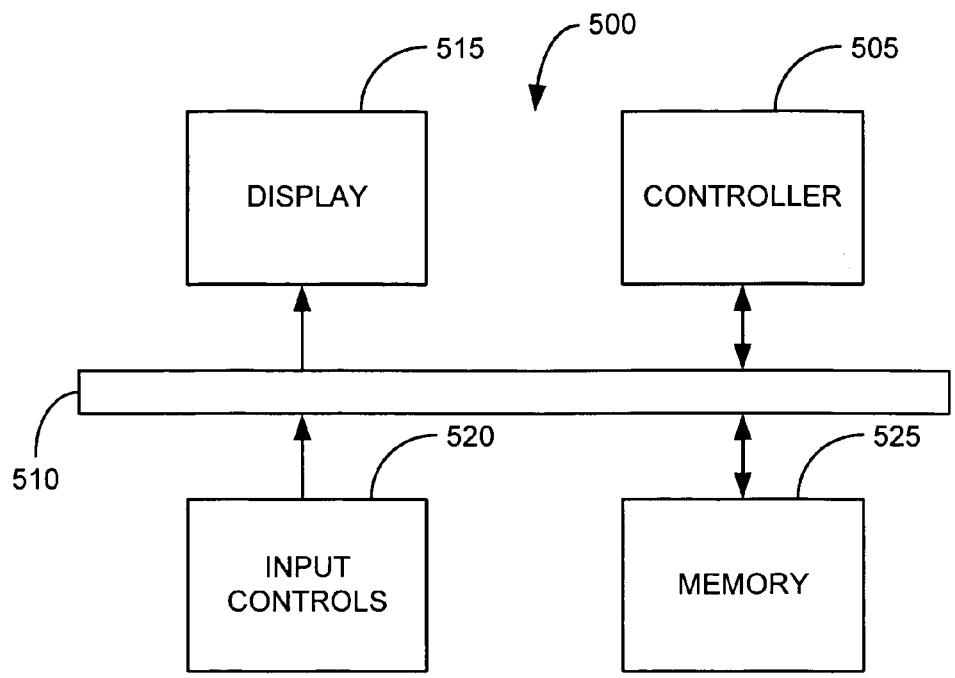
FIG. 5A is a block diagram of a computing device in accordance with an illustrative embodiment of the invention.

FIG. 5A is a block diagram of a computing device 500 in accordance with an illustrative embodiment of the invention. Computing device 500 may be any of a wide variety of devices such as a desktop PC, notebook computer, laptop computer, PDA, workstation, or other such device. In FIG. 5A, controller 505 communicates over data bus 510 with display 515, input controls 520, and memory 525. Input controls 520 may include, for example, a keyboard, a mouse, a trackball, a set of buttons (physical or virtual), or other input devices for controlling the operation of computing device 500.

Figure 5B:
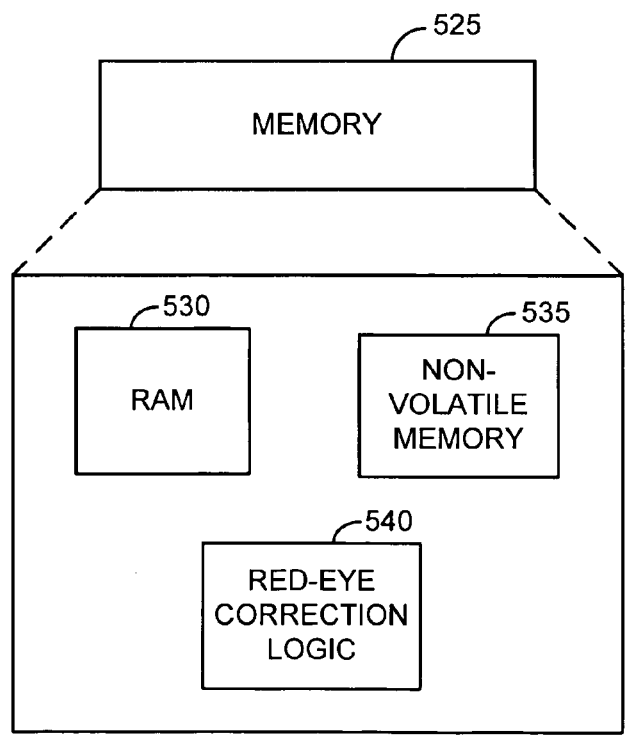
FIG. 5B is a diagram of a memory of the computing device shown in FIG. 5A in accordance with an illustrative embodiment of the invention.

FIG. 5B is a high-level diagram of memory 525. Memory 525 may comprise RAM 530, non-volatile memory 535 (e.g., hard disk drives and optical storage media), and red-eye correction logic 540. Red-eye correction logic 540 may be implemented in hardware, software, firmware, or any combination thereof. In one embodiment, red-eye correction logic 540 comprises firmware instructions that are executed by controller 505. Red-eye correction logic 540 may operate upon a digital image file 305 such as that described in FIGS. 3A and 3B to perform red-eye correction in a manner that incorporates iris-color information derived from pre-capture image data. Note that computing device 500 need not include image capture capability (such as optical system 140 and imaging module 115 of digital imaging device 100).

Figure 6:
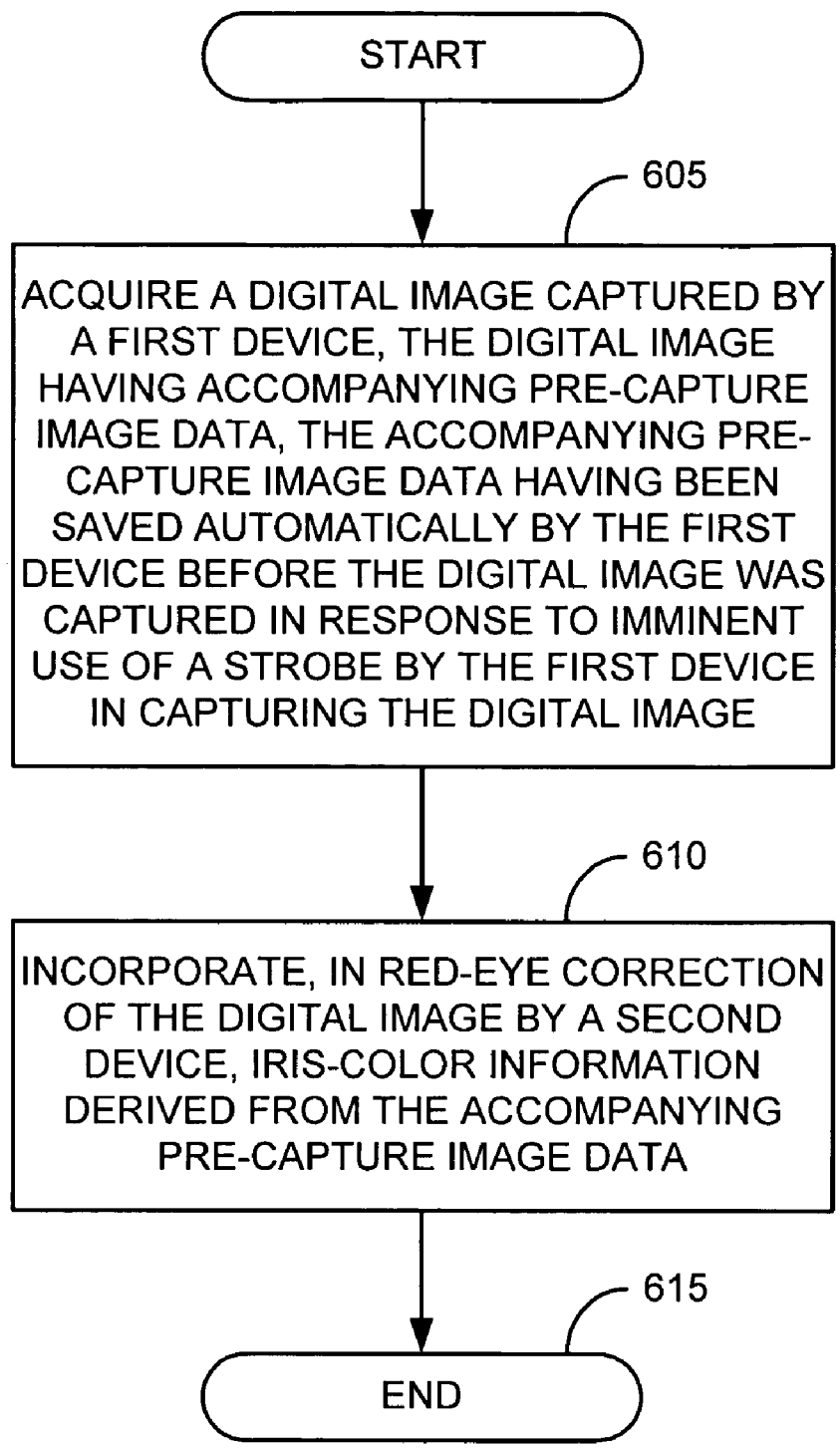
FIG. 6 is a flowchart of a method of operation of the computing device shown in FIG. 5A in accordance with an illustrative embodiment of the invention.

FIG. 6 is a flowchart of a method of operation of computing device 500 shown in FIG. 5A in accordance with an illustrative embodiment of the invention. At 605, computing device 500 may acquire a primary digital image 310 captured by a device such as digital imaging device 100 ("first device" in FIG. 6). The primary digital image 310 may have accompanying pre-capture image data, possibly stored in a single digital image file 305 with primary digital image 310, as described in connection with FIGS. 3A and 3B. The accompanying pre-capture image data may comprise, for example, a pre-capture image 205 (or relevant portions thereof).

Alternatively, the pre-capture image data may comprise one or more iris colors 215 and associated location indicators 315, as explained in connection with FIG. 3B. At 610, the red-eye correction logic 540 of computing device 500 ("second device" in FIG. 6) may incorporate, in red-eye correction of primary digital image 310, iris-color information derived from the accompanying pre-capture image data. At 615, the process may terminate. Incorporation in red-eye correction of iris-color information derived from the accompanying pre-capture image data may be accomplished by methods such as those shown in FIGS. 4B-4D.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for correcting red-eye effect in a digital image of a scene, comprising:
   determining that use of a strobe in capturing the digital image is imminent;
   automatically saving a pre-capture image of the scene, the pre-capture image being captured before the digital image; and
   incorporating, in red-eye correction of the digital image, iris-color information derived from the pre-capture image.

2. The method of claim 1, wherein automatically saving the pre-capture image of the scene is contingent upon the detection of at least one human face in the scene before the digital image is captured.

3. The method of claim 1, wherein the pre-capture image is saved with the digital image in a single digital image file.

4. The method of claim 1, wherein the pre-capture image comprises a preview frame, the preview frame being captured during a preview mode of a digital imaging device.

5. The method of claim 1, wherein the pre-capture image comprises a pre-flash image, the pre-flash image being captured using a reduced-intensity strobe.

6. The method of claim 1, wherein only a portion of the pre-capture image is automatically saved.

7. The method of claim 1, wherein incorporating, in red-eye correction of the digital image, iris-color information derived from the pre-capture image comprises obtaining an iris color from the pre-capture image.

8. The method of claim 7, wherein the luminance of the iris color is adjusted in accordance with a comparison of mean luminance between the pre-capture image and the digital image.

9. The method of claim 7, wherein the iris color and a corresponding location indicator are automatically stored with the digital image in a single digital image file.

10. The method of claim 1, wherein incorporating, in red-eye correction of the digital image, iris-color information derived from the pre-capture image comprises adjusting the luminance of a predetermined iris color in accordance with a comparison of mean luminance between the pre-capture image and the digital image.

11. The method of claim 10, wherein the predetermined iris color is black.

12. A method for correcting red-eye effect in a digital image of a scene, comprising:
    acquiring a digital image captured by a first device, the digital image having accompanying pre-capture image data, the accompanying pre-capture image data having been saved automatically by the first device before capture of the digital image in response to imminent use of a strobe by the first device in capturing the digital image; and
    incorporating, in red-eye correction of the digital image by a second device, iris-color information derived from the accompanying pre-capture image data.

13. The method of claim 12, wherein the first device comprises a digital camera and the second device comprises a computing device.

14. The method of claim 12, wherein automatic saving of the accompanying pre-capture image data is contingent upon detection by the first device, before the digital image is captured, of at least one human face in a scene to be photographed.

15. The method of claim 12, wherein the accompanying pre-capture image data comprises at least a portion of a pre-capture image.

16. The method of claim 15, wherein the pre-capture image comprises a preview frame, the preview frame having been captured during a preview mode of the first device.

17. The method of claim 15, wherein the pre-capture image comprises a pre-flash image, the pre-flash image having been captured using a reduced-intensity strobe.

18. The method of claim 15, wherein incorporating, in red-eye correction of the digital image by a second device, iris-color information derived from the accompanying pre-capture image data comprises obtaining an iris color from the pre-capture image.

19. The method of claim 18, wherein the luminance of the iris color is adjusted in accordance with a comparison of mean luminance between the pre-capture image and the digital image.

20. The method of claim 12, wherein the accompanying pre-capture image data comprises an iris color obtained from a pre-capture image and a corresponding location indicator.

21. The method of claim 12, wherein incorporating, in red-eye correction of the digital image by a second device, iris-color information derived from the accompanying pre-capture image data comprises adjusting the luminance of a predetermined iris color in accordance with a comparison of mean luminance between the accompanying pre-capture image data and the digital image.

22. The method of claim 21, wherein the predetermined iris color is black.

23. A digital imaging device, comprising:
    an optical system to produce an optical image;
    a shutter button;
    an imaging module to convert the optical image to a digital image, when the shutter button is actuated;
    a strobe;
    control logic configured to save automatically a pre-capture image, when the shutter button is actuated and use of the strobe is imminent; and
    red-eye correction logic configured to incorporate, in red-eye correction of the digital image, iris-color information derived from the pre-capture image.

24. The digital imaging device of claim 23, wherein the control logic is further configured to detect the presence of human faces in a scene to be photographed and the control logic saves the pre-capture image only when at least one human face has been detected in the scene.

25. The digital imaging device of claim 23, wherein the control logic is configured to save the pre-capture image with the digital image in a single digital image file.

26. The digital imaging device of claim 23, wherein the pre-capture image comprises a preview frame, the preview frame being captured during a preview mode of the digital imaging device.

27. The digital imaging device of claim 23, wherein the pre-capture image comprises a pre-flash image, the pre-flash image being captured using a reduced-intensity strobe of the digital imaging device.

28. The digital imaging device of claim 23, wherein the control logic saves only a portion of the pre-capture image.

29. The digital imaging device of claim 23, wherein the red-eye correction logic is configured to obtain, from the pre-capture image, an iris color for use in red-eye correction of the digital image.

30. The digital imaging device of claim 29, wherein the red-eye correction logic is further configured to adjust the luminance of the iris color in accordance with a comparison of mean luminance between the pre-capture image and the digital image.

31. The digital imaging device of claim 29, wherein the red-eye correction logic is further configured to store automatically the iris color and a corresponding location indicator with the digital image in a single digital image file.

32. The digital imaging device of claim 23, wherein the red-eye correction logic is configured to adjust the luminance of a predetermined iris color in accordance with a comparison of mean luminance between the pre-capture image and the digital image.

33. The digital imaging device of claim 32, wherein the predetermined iris color is black.

34. An electronic device, comprising:
a memory in which to store a digital image captured by a digital imaging device, the digital image having accompanying pre-capture image data, the accompanying pre-capture image data having been saved automatically by the digital imaging device before capture of the digital image in response to imminent use of a strobe by the digital imaging device in capturing the digital image; and
red-eye correction logic configured to incorporate, in red-eye correction of the digital image, iris-color information derived from the accompanying pre-capture image data.

35. The electronic device of claim 34, wherein the accompanying pre-capture image data comprises at least a portion of a pre-capture image.

36. The electronic device of claim 35, wherein the red-eye correction logic is configured to obtain an iris color from the pre-capture image.

37. The method of claim 36, wherein the red-eye correction logic is configured to adjust the luminance of the iris color in accordance with a comparison of mean luminance between the pre-capture image and the digital image.

38. The electronic device of claim 34, wherein the accompanying pre-capture image data comprises an iris color obtained from a pre-capture image and a corresponding location indicator.

39. The electronic device of claim 34, wherein the red-eye correction logic is configured to adjust the luminance of a predetermined iris color in accordance with a comparison of mean luminance between the accompanying pre-capture image data and the digital image.

40. The electronic device of claim 39, wherein the predetermined iris color is black.

41. The electronic device of claim 34, wherein the electronic device is one of a desktop computer, a workstation, a laptop computer, a notebook computer, and a PDA.

42. A digital imaging device, comprising:
means for producing an optical image;
means for initiating digital image capture;
means for converting the optical image to a digital image, when the means for initiating digital image capture is actuated;
means for illuminating a scene;
means for saving automatically a pre-capture image, when the means for initiating digital image capture is actuated and use of the means for illuminating a scene is imminent; and
means for correcting red-eye effect configured to incorporate, in red-eye correction of the digital image, iris-color information derived from the pre-capture image.

43. An electronic device, comprising:
means for storing a digital image captured by a digital imaging device, the digital image having accompanying pre-capture image data, the accompanying pre-capture image data having been saved automatically by the digital imaging device before capture of the digital image in response to imminent use of a strobe by the digital imaging device in capturing the digital image; and
means for correcting red-eye effect configured to incorporate, in red-eye correction of the digital image, iris-color information derived from the accompanying pre-capture image data.

* * * * *